W. S. ELLIOTT.
STRAINER.
APPLICATION FILED JUNE 24, 1909.

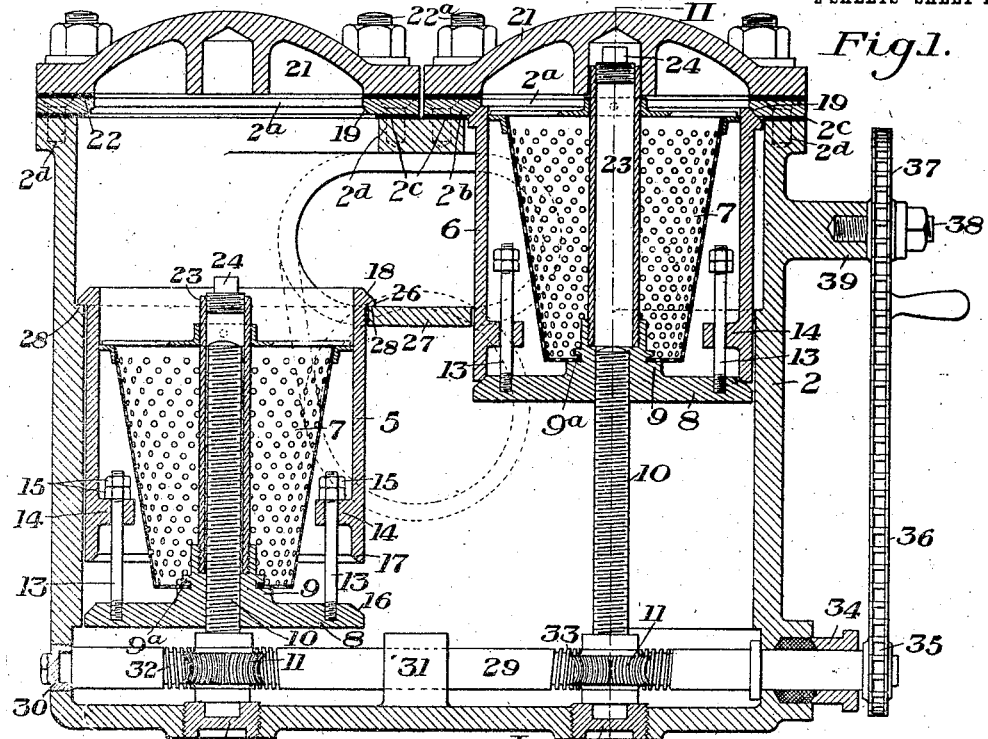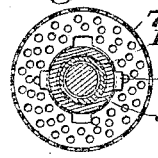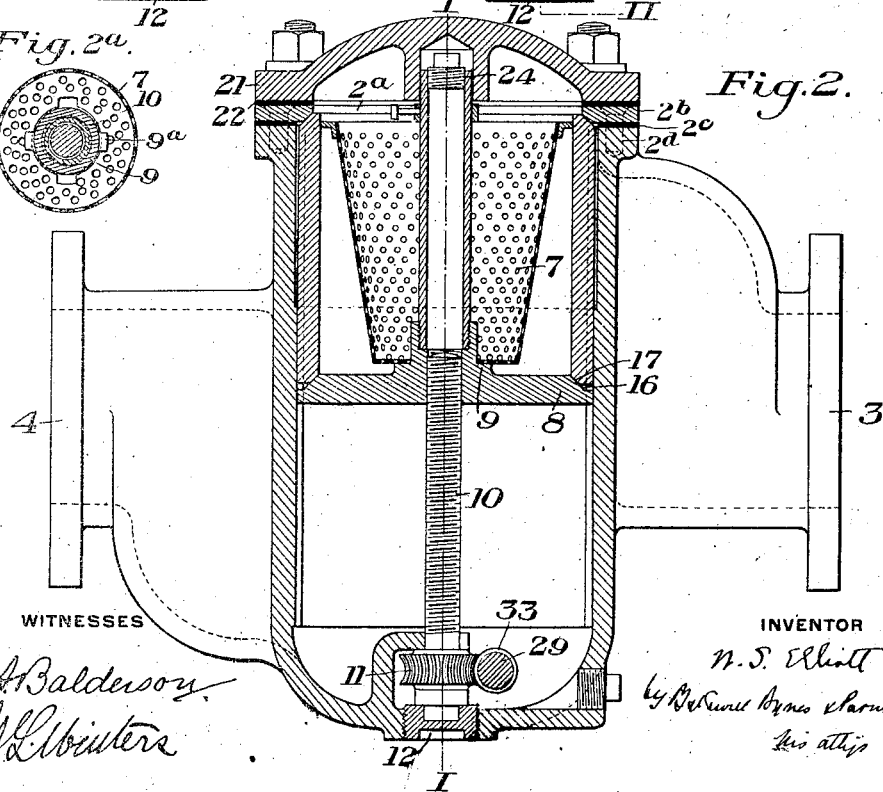

937,676.

Patented Oct. 19, 1909.
2 SHEETS—SHEET 2.

WITNESSES
INVENTOR

UNITED STATES PATENT OFFICE.

WILLIAM S. ELLIOTT, OF PITTSBURG, PENNSYLVANIA.

STRAINER.

937,676.

Specification of Letters Patent.   Patented Oct. 19, 1909.

Application filed June 24, 1909. Serial No. 504,093.

*To all whom it may concern:*

Be it known that I, WILLIAM S. ELLIOTT, of Pittsburg, Allegheny county, Pennsylvania, have invented a new and useful Improvement in Strainers, of which the following is a full, clear, and exact description, reference being had to the accompanying drawings, forming part of this specification.

My invention has relation to the class of strainers, and is designed to provide a strainer of improved construction having a duplicate arrangement of strainer baskets or cages, together with means whereby either one of the strainers can be cleaned or renewed, while the other one remains in operation.

A further object is to provide a strainer of this character, the casing of which can be made as an integral casting and without joints, except at the top where separate seating rings for the strainer elements are employed.

A still further object is, to provide improved means for raising and lowering the strainer cages and baskets; also to provide means for effectively preventing leakage from the strainer casing when either of the strainers is moved to a position for cleaning or renewal.

Other objects and advantages of the invention will hereinafter appear.

My invention will be best understood by reference to the accompanying drawings in which I have illustrated two different embodiments thereof, and which will now be described.

Figure 3:
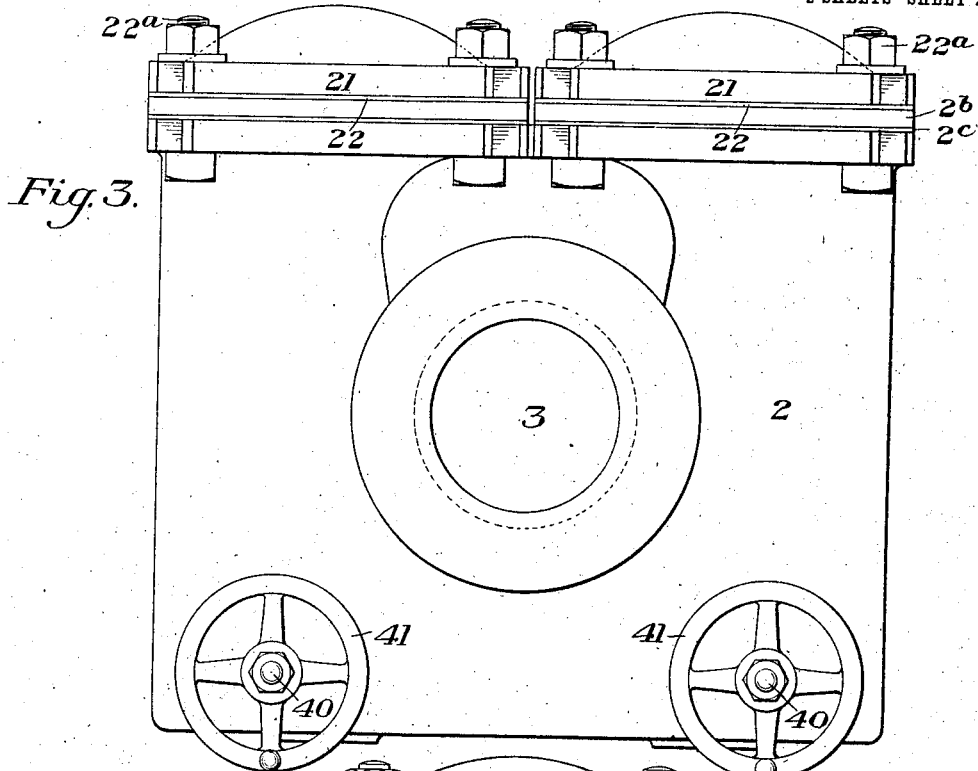
Figure 4:
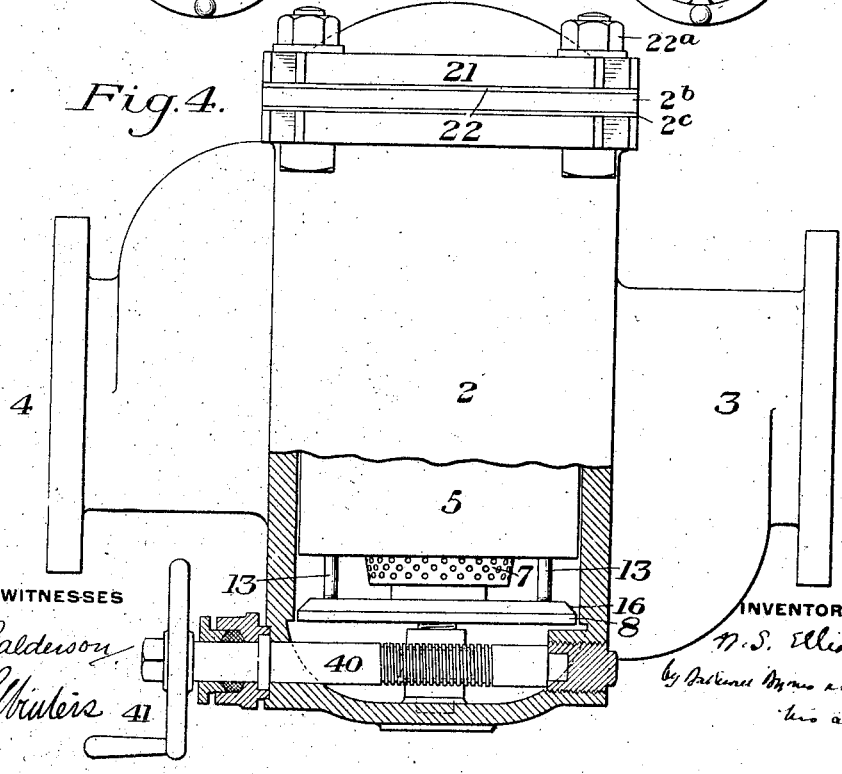

In these drawings, Figure 1 is a longitudinal section of a strainer embodying my invention; Fig. 2 is a transverse section: Fig. 2ª is a detail view; Fig. 3 is a side view showing a modification; Fig. 4 is an end view of the strainer shown in Fig. 3, partly broken away.

Referring first to the form of my invention in the form of Figs. 1 and 2, the numeral 2 designates the casing of the strainer which is cast in one integral piece, with openings 2ª at the top. The casing has at one end an inlet connection 3, and at the opposite end an outlet connection 4, said connections preferably communicating with the interior of the casing at different levels, or at different sides of a partition member. Seated on the top of the casing around the openings 2ª, are removable rings 2ᵇ having packing 2ᶜ, and secured by the stud bolts 2ᵈ.

5 and 6 designate two cylinders or barrels, which are arranged side by side within the casing, said cylinders or barrels being open at both their upper and lower ends. Placed centrally in each of these cylinders or barrels is a strainer basket or cage 7, which may be of any well known character, such as perforated metal, and which is preferably of decreasing diameter toward its lower end. These cages or baskets are open at their upper ends, and are secured at their lower ends to the valve heads 8 in the manner hereinafter described. Each of these heads has a central hub portion 9 provided with an interior screw thread, which engages the thread of a screw shaft 10 provided at its lower end portion with a worm wheel 11. These screw shafts are stepped at their lower ends in bearings formed by screw plugs or bushings 12 inserted in openings in the bottom wall of the casing 2. Secured in each valve head 8 and extending upwardly therefrom are two or more bolts or rods 13, which loosely engage inwardly projecting lugs 14 on the interior of the barrel or cylinder, and are provided with nuts 15 at their upper ends. The upper circumferential edges of the heads 8 are preferably chamfered or beveled as shown at 16 to seat against the corresponding chamfer or bevel 17 at the lower ends of the cylinders or barrels 5 and 6, said heads acting as valves or closures for the bottoms of the cylinders or barrels when the latter are elevated into position for cleaning as shown at the right-hand side of Fig. 1. The upper ends of the cylinders or barrels are also surfaced or chamfered as shown at 18 to fit the seats 19 on the rings 2ᵇ, said seats surrounding the openings 2ª through which access is had for cleaning, for inserting and removing or repairing the valves and screen cages or baskets. These openings 2ª are normally closed by the removable covers 21, provided with packing 22 and secured by the bolts 22ª. Secured in the hub portion 9 of each head 8 is a vertical sleeve or tube 23, which extends centrally upward through the cage or basket and above the upper end of the same. These sleeves or tubes surround and protect the screw shafts 10 when the strainers are in their lower working position, and leakage around the screw, and upwardly through these tubes or sleeves is prevented, by means of the screw plugs 24 inserted in the upper ends of the tubes or sleeves. For the purpose of obtaining a positive connection between the valve heads and strainer baskets or cages, the hub portions of the valve heads are provided with lugs 9ª, and the bottoms of the baskets or cages have slots adapted to pass over these lugs. After the baskets or cages have been sealed, they are partially rotated, thereby bringing the lugs over the unslotted portion of the bottoms and forming a positive connection for the baskets or cages, by means of which they will be positively drawn down with the barrel or cylinder 5 as the strainer is lowered to its working position. Each barrel or cylinder is also preferably provided near its upper end with the external lugs or flange 26, which engages a cross partition member 27 of the casing, and also a seat 28 on the wall of the casing to support the cylinder or barrel in its lowered position.

29 is a longitudinal shaft, which is supported at its ends in suitable bearings 30 in the casing walls near the bottom of the casing, one or more intermediate bearings 31 being also preferably provided. This shaft carries worms 32 and 33 of opposite thread, and which engage respectively the worm wheels 11 of the two screw shafts 10. The shaft is extended exteriorly of the casing at one end through a stuffing box 34. On this projecting end of the shaft is a chain wheel 35 connected by a chain 36 with a hand wheel 37 mounted on a stub shaft 38 secured in a projecting lug 39 on the casing. By turning this hand wheel, the shaft 29 will be rotated to thereby actuate the screw shafts 10 to simultaneously raise one strainer and lower the other. The hand wheel might be applied directly to the end of the shaft 29; but ordinarily the strainer will set in too low a position to make this possible, and hence I prefer to gear the shaft 29 to the shaft of the hand wheel at a higher elevation.

The operation will be readily understood. With the parts in the position shown in Fig. 1, the left-hand barrel 5 with its contained strainer cage or basket is in operative position, while the right-hand cylinder or barrel with its contained strainer cage or basket is raised into position for cleaning. The water contained within the chamber of the casing enters the strainer cage or basket at its upper end, and passes downwardly therethrough and out into the lower portion of said chamber below the cross-member 27 which acts as a partition between the upper and lower portions of said chamber so that substantially all the water entering the upper portion of the chamber is compelled to pass through the strainer cage or basket to reach the lower portion with which the outlet connection communicates. In the lowered position of the parts, the barrel or cylinder 5 is supported on the cross-member 27 and seat 28, and the valve head 8 is drawn down to its lowered position, thereby opening the lower end of the cylinder or barrel to permit egress of the strained liquid. When the shaft 29 is operated, the head 8 of the lower strainer is first raised into position to close the lower end of the barrel and the entire strainer is then moved upwardly until the seating edge of the cylinder or barrel closes against the seat 19. In the meantime the other strainer has been lowered into operative position.

The form of the invention shown in Figs. 3 and 4 is similar to that shown in Figs. 1 and 2, except that instead of connecting the two screw shafts 10 by gearing so that they will be simultaneously actuated, I provide each of the shafts 10 with a separate actuating shaft 40, each of said shafts having its own hand wheel 41. In this form of the invention it will be obvious that either strainer may be raised or lowered independently of the other.

The advantages of the invention will be apparent. As soon as one of the strainers becomes clogged, it can be raised to position to be cleaned while the other one is lowered to operative position. In the form of the invention shown in Figs. 3 and 4, both strainers may be lowered to operative position at the same time, if desired. The entire apparatus is simple in its construction; the casing can be formed as an integral casting, without joints, except at the top openings where the covers are applied and where leakage is prevented in the manner described; the parts are all readily accessible; and the construction is such that leakage from the casing is prevented while the strainers are being cleaned.

It will be obvious that many changes may be made in the details of construction and arrangement of the various parts without departing from the spirit and scope of the invention. Thus, any suitable form of strainer cage or basket may be employed; various means for raising and lowering the strainers can be provided, and various other changes made.

What I claim is:—

1. In straining apparatus, an integral casing having inlet and outlet chambers, two straining elements within the casing, means for raising and lowering said elements, and means for closing the lower end of each element when said element is in its raised position and for opening said lower end when the element is in its lowered position; substantially as described.

2. Straining apparatus, comprising an integral casing or shell provided with inlet and outlet compartments, and having cleaning openings in one wall of the inlet compartment, straining elements within the casing and movable from the outlet compartment into the inlet compartment, and means for closing the lower end of each element when the latter is in its raised position and for opening the lower end of said element when the element is in its lowered position; substantially as described.

3. Straining apparatus, comprising a casing having inlet and outlet compartments, two movable straining elements within the casing, and means for simultaneously moving the said elements in opposite directions; substantially as described.

4. In a strainer, a straining element comprising a cylinder or barrel open at its ends, a head or valve adapted to close the lower end of the cylinder or barrel, a strainer cage or basket supported by the central portion only of the head or valve and extending within the cylinder or barrel, an actuating shaft engaging the head or valve, and a loose connection between the head or valve and the cylinder or barrel; substantially as described.

5. In a strainer, a straining element comprising a cylinder or barrel open at its ends, a head or valve arranged to close the lower end of the cylinder or barrel, a loose connection between the head or valve and the cylinder or barrel, a strainer cage or basket supported by the central portions of the head or valve, a screw shaft engaging the head or valve, and means for actuating said shaft; substantially as described.

6. In a strainer, a straining element comprising a cylinder or barrel open at its ends, a head or valve arranged to close the lower end of the cylinder or barrel, a loose connection between the head or valve and the cylinder or barrel, a strainer cage or basket supported by the head or valve, and a tube or sleeve secured to the head or valve and into which the screw shaft is arranged to extend; substantially as described.

7. In a strainer, a strainer element comprising a cylinder or barrel open at its ends, a head or valve arranged to close the lower end of the cylinder or barrel, a loose connection between the head or valve and the cylinder or barrel, a strainer cage or basket supported by the head or valve, a tube or sleeve secured to the head or valve and into which the screw shaft is arranged to extend, means for closing the upper end of the sleeve or tube, and a connection between the sleeve or tube and the cage or basket; substantially as described.

8. In a strainer, a casing having a cleaning opening in its upper wall, a seating surface surrounding said opening, a vertically moving strainer element comprising a cylinder or barrel open at its ends, and a strainer cage or basket within the barrel, said barrel having a seating surface at its upper edge adapted to coöperate with the seating surface surrounding said opening, means for raising and lowering the barrel and the strainer cage, and means for closing the lower end of the barrel when the latter is in its raised position; substantially as described.

9. In a strainer, a casing consisting of an integral casting having a partition wall, and a plurality of access openings at one side of the partition wall, separate seating rings secured to the casting around said openings, strainer elements having seating surfaces arranged to coact with surfaces of the seating rings, and removable covers for said openings; substantially as described.

10. In a strainer, a casing consisting of an integral casting having a partition wall, and a plurality of access openings at one side of the partition wall, separate seating rings secured to the casting around said openings, removable covers for said openings, said rings having seating surfaces, and strainer elements having seating surfaces arranged to coact therewith; substantially as described.

11. A multiple strainer, comprising an integral casing having inlet and outlet compartments or chambers, the inlet chamber having access openings in one wall thereof, a plurality of strainer elements movable from the inlet compartment into the outlet compartment below said openings, covers for closing the said openings, and seating rings which seat the covers and also the strainer elements when the latter are moved into the outlet chamber or compartment; substantially as described.

In testimony whereof, I have hereunto set my hand.

WILLIAM S. ELLIOTT.

Witnesses:
A. F. Tibbetts,
H. M. Corwin.